Dec. 18, 1928.

C. F. M. VAN BERKEL 1,695,620

COMPUTING SCALE

Filed July 13, 1927   2 Sheets-Sheet 1

Inventor
Cornelis F. M. van Berkel
By Nissen & Crane Attys.

Dec. 18, 1928.
C. F. M. VAN BERKEL
1,695,620
COMPUTING SCALE
Filed July 13, 1927  2 Sheets-Sheet 2
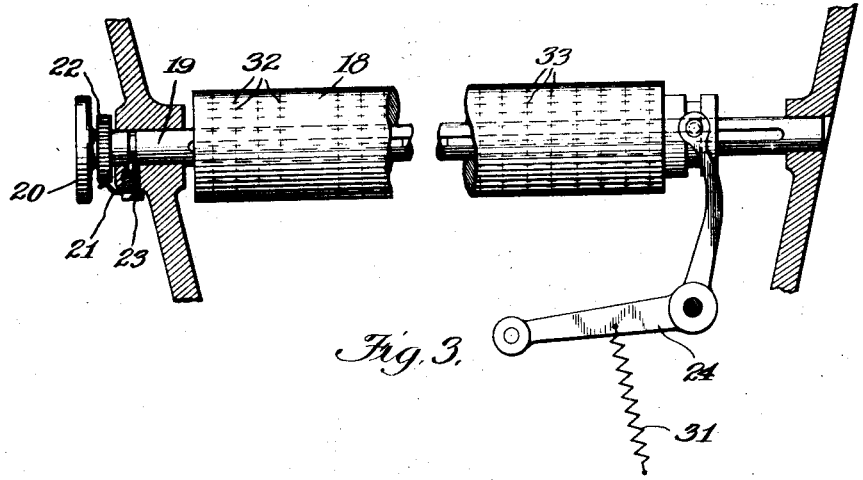
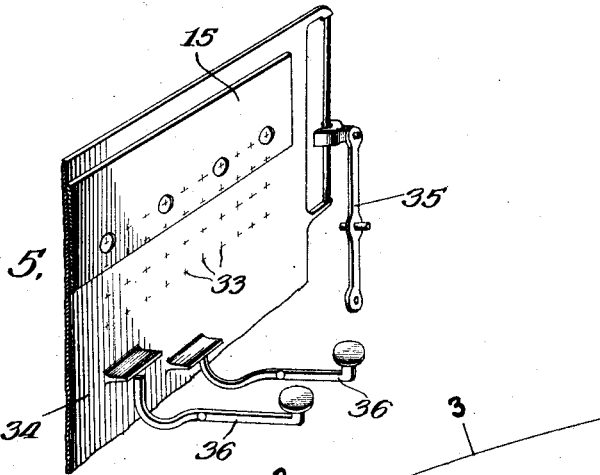
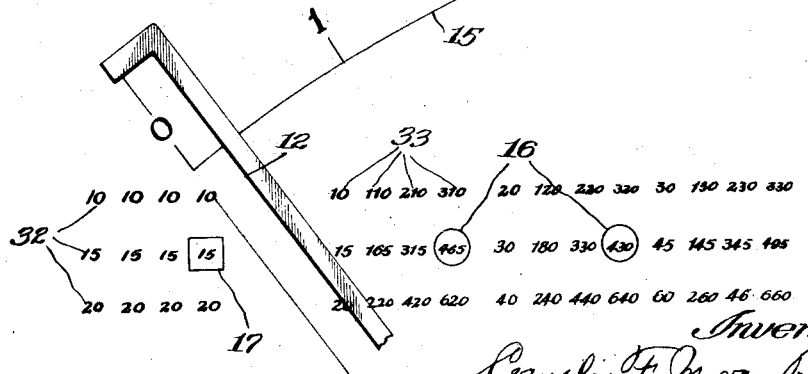

Patented Dec. 18, 1928.

1,695,620

UNITED STATES PATENT OFFICE.

CORNELIS FRANCISCUS MARIA VAN BERKEL, OF WASSENAAR, NETHERLANDS, ASSIGNOR TO NAAMLOOZE VENNOOTSCHAP MAATSCHAPPIJ TOT VERAARDIGING VAN SNIJMACHINES VOLGENS VAN BERKEL'S PATENT EN VAN ANDERE WERKTUIGEN, OF ROTTERDAM, NETHERLANDS, A LIMITED LIABILITY COMPANY OF THE NETHERLANDS.

COMPUTING SCALE.

Application filed July 13, 1927, Serial No. 205,299, and in the Netherlands March 5, 1926.

This invention relates to computing scale mechanism in which the total value of a given commodity weighed upon a scale is automatically indicated at various unit prices at which the scale may be set.

One object of the invention is to provide computing mechanism of the class named which is applicable to scales that may be adjusted to different capacities and which will indicate the correct values when the scale is set for different weighing capacities.

Other objects will appear from the following description.

The invention is exemplified in the combination and arrangement of parts shown in the accompanying drawings and described in the following specification, and it is more particularly pointed out in the appended claims.

In the drawings—

Fig. 3 is an elevation of a computing drum and operating mechanism forming a part of the present invention;

Fig. 4 is a diagrammatic view illustrating one dial arrangement for the invention; and Fig. 5 is a perspective view of a modified form of a figure dial.

Figure 1:
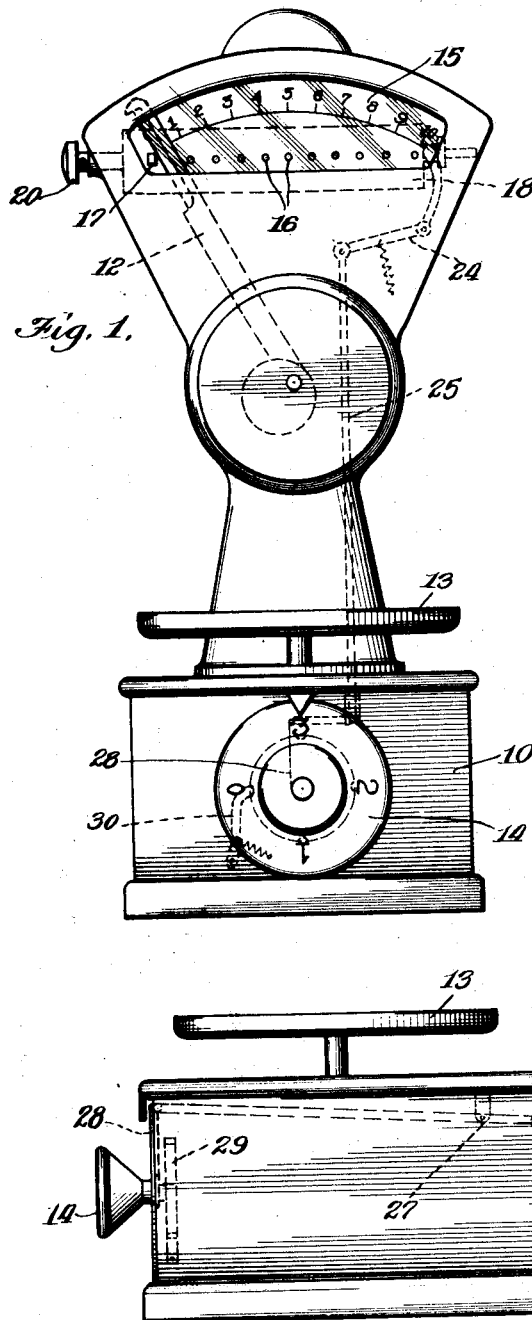
Fig. 1 is a front elevation of a weighing scale having one embodiment of the present invention applied thereto.
Figure 2:
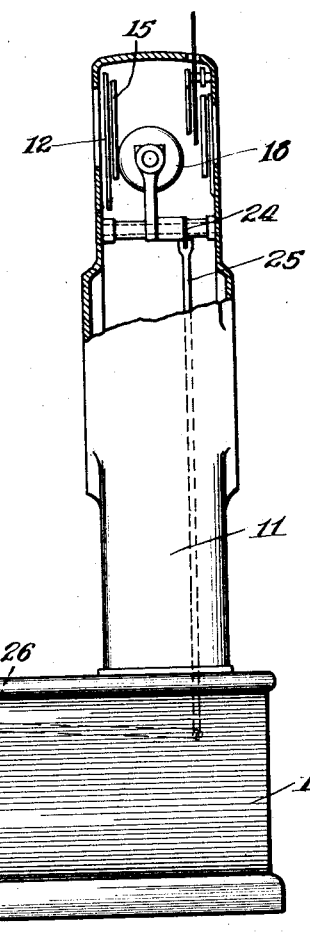
Fig. 2 is a side elevation, with parts in section, showing the device of Fig. 1.

The form of the invention illustrated comprises a scale having a base 10 and an upright 11, the same being supplied with weighing mechanism for operating an indicator 12 when weight is placed upon a pan 13. A knob or hand wheel 14 is provided for adding and removing auxiliary counterbalance weights to the scale mechanism for increasing and decreasing the capacity of the scale. The weighing and capacity changing mechanism is well known in the art and is not illustrated in the drawings.

The indicator 12 plays in front of a dial plate 15 having graduations thereon for indicating the weight on the pan 13. Below the graduations on the dial plate 15 is a series of openings 16 and at one end of the series of openings 16 there is an additional opening 17 of different shape from the openings 16. In the illustration the openings 16 are circular and the opening 17 is rectangular. In the rear of the openings 16 and 17 there is mounted a drum 18 slidably supported on a shaft 19 which is journaled in the casing 11. The shaft 19 extends through the casing and carries a knob by means of which the shaft may be rotated. A spring 21 and a knurled wheel 22 holds the shaft against accidental rotation. A set screw 23 prevents longitudinal movement of the shaft.

The drum 18 is splined on the shaft 19 so that it may be slid longitudinally of the shaft, but is constrained to rotate therewith. Longitudinal movement of the shaft is effected by a bell crank 24 connected by a link 25 to a lever 26 pivoted at 27 in the base 10. The front end of the lever 26 carries a flexible member 28 arranged to be wound on the shaft which supports the knob 14. The knob 14 is provided with a ratchet wheel 29 and a spring detent 30 for holding it in different positions of adjustment. Rotation of the knob 14 in a counter-clockwise direction, as viewed in Fig. 1, will wind the member 28 upon the spindle of the knob and raise the link 25 to rock the bell crank lever 21 in a clockwise direction against the tension of spring 31 attached to the bell crank lever. This direction of rotation of the knob removes the supplemental counter-weights from the weighing mechanism to reduce the capacity of the scale. Rotation of the knob 14 in a clockwise direction, which is the direction of rotation for increasing the capacity of the scale, will shift the drum 18 to the left, as viewed in Figs. 1 and 3.

The drum 18 carries a set of unit price figures 32 arranged in rows both circumferentially and longitudinally of the drum. The price figures in any longitudinal row are all the same, but increase progressively in the circumferential rows. The drum 18 may be rotated by the knob 20 to bring the particular unit price at which the value of a commodity is to be computed into registration with the opening 17. Movement of the drum longitudinally of the shaft 19 will not change the unit price displayed through the opening 17. A second series of figures 33 are arranged on the drum 18 in position to be displayed through the circular openings 16. The figures 33 are arranged in sets to indicate total values for the different weights shown on the scale 15. For instance, referring to the horizontal row of figures in Fig. 4 arranged in registration with the openings 16, it will be seen that the first figure at the left of the first set of four figures shows the total value of one pound at the price indicated, namely, fifteen cents per pound. The first figure in the second set of four figures indicates the value of two pounds at the unit price. The first figure of the third set indicates the total value of three pounds at this price, and so on to the end of the drum. If the drum were shifted to the extreme right end of its longitudinal movement, the numbers fifteen, thirty and forty-five would appear through the successive openings 16. This is the position that the drum would occupy when all of the supplemental weights are removed, or, in other words, when the knob 14 is at the extreme limit of its rotation counterclockwise. The openings 16 are distributed longitudinally of the dial plate 15 so that the indicator 12 will indicate the first one of the openings 16 when it registers with the number 1 on the dial and with the second opening 16 when it registers with the number 2 on the dial, and so on. It will thus be seen that if the knob 14 is set at the lowest capacity of the scale and the knob 20 rotated to disclose the unit price fifteen, the indicator 12 will register with the particular opening 16 which disclosed the total value at fifteen cents per pound corresponding to the weight indicated by the pointer 12 on the scale 15.

If now the knob 14 should be turned to add a supplemental weight, increasing the capacity of the scale by one-hundred pounds, the drum 18 would be shifted to the left, as viewed in Figs. 3 and 4, so that the total values indicated through the openings 16 would be the value of one hundred pounds plus the readings indicated by the pointer 12. If a further adjustment of the capacity of the scale were made to increase its capacity by an additional one-hundred pounds, the total values indicated would be that of two-hundred pounds, plus the weight indicated by the pointer 12. If a further adjustment were made to increase the capacity of the scale by three-hundred pounds, the total values indicated through the openings 16 would correspond to that of the values of the weights shown by the pointer 12, plus the value of three-hundred pounds at the unit price selected. This last is the setting indicated in Figs. 1 and 4. It will be understood that the diagram shown in Fig. 4 is merely for illustrating the principle of operation and does not show all of the numbers that would be used on a complete chart. Usually the scale 15 would indicate weights up to an amount corresponding to that by which the capacity of the scale is increased when the knob 14 is turned through a single division of its range of rotation.

It will be apparent that other forms of supports may be used for the figure chart. For instance, in Fig. 5, the numerals 32 and 33 are carried on a flat plate 34 which is horizontally movable by means of a lever 35 connected with the capacity changing mechanism and is vertically movable by price keys 36 corresponding to different unit prices, the price keys being arranged to move the plate 34 vertically different amounts to display the unit price corresponding to the particular key depressed.

Other modifications and arrangements of the details of construction will readily suggest themselves to those skilled in the art.

The only manipulation required of the operator is to rotate the hand wheel 20 to indicate the unit price selected through the opening 17 and the pointer 12 will then indicate the total value corresponding to the weight on the scale. The illustration shows an arrangement for indicating the value corresponding to the closest unit of weight to the actual weight on the scale. It will be understood that the arrangement may be varied to show values with varying degrees of exactness, depending upon the character of the commodities to be weighed. When a change of capacity is required, it is only necessary to rotate the knob 14 and the computing mechanism will thereby be automatically adjusted to indicate the total values corresponding to the adjusted capacity of the weighing device.

I claim:

1. A weighing scale having a device for adjusting the capacity of said scale, an indicating dial having a table thereon of various unit prices of commodities and a table having numerals thereon arranged according to varying weighing capacities of said scale, means for adjusting said dial for different unit prices, and means for adjusting said dial corresponding with the weighing capacity for which said scale is set.

2. A weighing scale comprising a dial having a table of unit prices thereon and also a table of total values thereon, means for adjusting said dial in one direction to set said dial for operation at a selected unit price, and means for adjusting said dial in a different direction to correspond to different capacities of a weighing scale.

3. In a weighing scale having capacity setting means, a dial having a table of unit prices thereon and a table of total values, means for adjusting said dial in one direction to set said dial for selected unit prices, and means connected with said capacity changing means for adjusting said dial in a different direction to bring into operation numbers on said second-mentioned table corresponding to the capacity for which said scale is set.

4. A weighing scale comprising a weight indicating member, a table co-operating with said weight indicating member for indicating values corresponding to the weight indicated by said member, means for adjusting said table to indicate values at different unit prices, and means for adjusting said table to indicate values for different capacities of said scale for the various positions of said weight indicating member.

5. A weighing scale comprising a weight indicating member, a number table co-operating with said weight indicating member for indicating values corresponding to the weight indicated by said member for different unit values, means for indicating the particular unit value for which said table is set to operate, means for changing the capacity of said weighing scale, and means operated by said capacity changing means for adjusting said table to permit total values to be shown thereby corresponding to the particular capacity for which said scale is set.

6. In a weighing scale having means for setting said scale for different capacities, an adjustable chart having a table of unit prices thereon and a table of total values, a weight controlled member co-operating with said chart to indicate values corresponding to weights on said scale, means for adjusting said chart in one direction to vary the unit prices at which values are computed, means for changing the capacity of said scale, and means operated by said capacity changing means for adjusting said chart to permit computation of values commensurate with the different capacities at which said scale is set.

7. A weighing scale having a device for adjusting the capacity of said scale, an indicating dial comprising a rotary cylinder having a table thereon of various unit prices of commodities, and a table having numerals thereon arranged according to varying weighing capacities of said scale, means for adjusting said cylinder to obtain different unit prices, and means for adjusting said cylinder corresponding with the weighing capacity for which said scale is set.

8. A weighing scale having a device for adjusting the capacity of said scale, an indicating dial comprising a rotary cylindrical member having a table thereon of various unit prices of commodities and a table having numerals thereon arranged according to varying weighing capacities of said scale, means for rotating said cylindrical member to obtain different unit prices, and means for adjusting said cylindrical member corresponding with the weighing capacity for which said scale is set.

In testimony whereof I have signed my name to this specification on this 27th day of June A. D. 1927.

CORNELIS FRANCISCUS MARIA van BERKEL.